(12) United States Patent
Milstein

(10) Patent No.: US 11,340,093 B2
(45) Date of Patent: *May 24, 2022

(54) SUBMAP GEOGRAPHIC PROJECTIONS

(71) Applicant: UATC, LLC, San Francisco, CA (US)

(72) Inventor: Adam Henry Polk Milstein, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/946,971

(22) Filed: Jul. 13, 2020

(65) Prior Publication Data

US 2021/0003415 A1 Jan. 7, 2021

Related U.S. Application Data

(60) Continuation of application No. 15/891,017, filed on Feb. 7, 2018, now Pat. No. 10,712,168, which is a division of application No. 62/611,315, filed on Dec. 28, 2017.

(51) Int. Cl.
*G01C 21/36* (2006.01)
*G01C 21/34* (2006.01)
*G01C 21/32* (2006.01)

(52) U.S. Cl.
CPC ........... *G01C 21/367* (2013.01); *G01C 21/32* (2013.01); *G01C 21/34* (2013.01)

(58) Field of Classification Search
None
See application file for complete search history.

(56) References Cited

U.S. PATENT DOCUMENTS

| 10,712,168 B2 | 7/2020 | Milstein | |
| 2014/0379247 A1* | 12/2014 | Ferguson | B60W 30/16 701/301 |
| 2015/0185026 A1* | 7/2015 | Hightower | G01C 21/3658 701/533 |
| 2017/0039436 A1* | 2/2017 | Chen | G06K 9/4628 |
| 2017/0132843 A1* | 5/2017 | Fan | G01C 21/206 |
| 2019/0204105 A1 | 7/2019 | Milstein | |

OTHER PUBLICATIONS

"U.S. Appl. No. 15/891,017, Non Final Office Action dated Oct. 17, 2019", 8 pgs.

(Continued)

*Primary Examiner* — Jonathan M Dager
*Assistant Examiner* — Garrett F Evans
(74) *Attorney, Agent, or Firm* — Schwegman Lundberg & Woessner, P.A.

(57) ABSTRACT

A method includes obtaining map data associated with a map of a geographic location including one or more roadways, the map including a first submap represented by a first local Euclidean space and a second submap represented by a second local Euclidean space. A route that includes a first roadway in the first submap and a second roadway in the second submap is determined using a first projection between a global coordinate system and the first local Euclidean space and a second projection between the global coordinate system and the second local Euclidean space. The route is provided to an autonomous vehicle (AV) for driving on the first roadway and the second roadway.

20 Claims, 10 Drawing Sheets

(56) References Cited

OTHER PUBLICATIONS

"U.S. Appl. No. 15/891,017, Response filed Jan. 17, 2020 to Non Final Office Action dated Oct. 17, 2019", 11 pgs.
"U.S. Appl. No. 15/891,017, Notice of Allowance dated Mar. 9, 2020", 8 pgs.
U.S. Appl. No. 15/891,017 U.S. Pat. No. 10,712,168, filed Feb. 7, 2018, Submap Geographic Projections.

* cited by examiner

SUBMAP GEOGRAPHIC PROJECTIONS

CROSS REFERENCE TO RELATED APPLICATION

This application is a continuation of and claims the benefit of priority of U.S. application Ser. No. 15/891,017, filed Feb. 7, 2018, which claims the benefit of priority of U.S. Provisional Application No. 62/611,315, filed Dec. 28, 2017, the entire disclosure of each of which is hereby incorporated by reference in their entireties.

BACKGROUND

An autonomous vehicle (AV) (e.g., a driverless car, a driverless auto, a self-driving car, a robotic car, etc.) is a vehicle that is capable of sensing an environment of the vehicle and traveling (e.g., navigating, moving, etc.) in the environment without human input. An AV uses a variety of techniques to detect the environment of the AV, such as radar, laser light, Global Positioning System (GPS), odometry, and/or computer vision. In some instances, an AV uses a control system to interpret information received from one or more sensors, to identify a route for traveling, to identify an obstacle in a route, and to identify relevant traffic signs associated with a route.

SUMMARY

According to some non-limiting embodiments or aspects, provided is a method including obtaining, with a computer system including one or more processors, map data associated with a map of a geographic location including one or more roadways, the map including a first submap represented by a first local Euclidean space and a second submap represented by a second local Euclidean space; determining, with the computer system, a route that includes a first roadway in the first submap and a second roadway in the second submap using a first projection between a global coordinate system and the first local Euclidean space and a second projection between the global coordinate system and the second local Euclidean space; and providing, with the computer system, the route to an autonomous vehicle (AV) for driving on the first roadway and the second roadway.

In some non-limiting embodiments or aspects, the route includes a map represented by the global coordinate system.

In some non-limiting embodiments or aspects, the first projection includes a first transverse Mercator centered at a first point in the global coordinate system, and the second projection includes a second transverse Mercator centered at a second point in the global coordinate system that is different than the first point.

In some non-limiting embodiments or aspects, the first submap includes a first portion located in a first Universal Transverse Mercator (UTM) zone, and the second submap includes a second portion located in a second UTM zone different than the first UTM zone.

In some non-limiting embodiments or aspects, the first point includes first latitude and longitude coordinates, and the second point includes second latitude and longitude coordinates.

In some non-limiting embodiments or aspects, the first point corresponds to an origin point of the first local Euclidean space, and the second point corresponds to an origin point of the second local Euclidean space.

In some non-limiting embodiments or aspects, determining the route further includes: determining, with the computer system, a transform between the first local Euclidean space and the second local Euclidean space; and determining, with the computer system, the route based on the transform.

In some non-limiting embodiments or aspects, the route further includes the one or more roadways in at least one third submap between the first submap and the second submap, the third submap being represented by a third local Euclidean space, and determining the route further includes: transforming, with the computer system, a first local point in the first local Euclidean space to a first global point in the global coordinate system based on the first projection; transforming, with the computer system, a second local point in the second local Euclidean space to a second global point in the global coordinate system based on the second projection; transforming, with the computer system, a third local point in the third local Euclidean space to a third global point in the global coordinate system based on a third projection between the global coordinate system and the third local Euclidean space; and determining, with the computer system, a position of the first local point relative to the second local point and the third local point in the global coordinate system.

In some non-limiting embodiments or aspects, determining the route further includes: receiving, with the computer system, a global point including a latitude coordinate and a longitude coordinate; determining in the map, with the computer system, a closest submap associated with the global point, the closest submap being represented by a closest local Euclidean space; and determining, with the computer system, a local point in the closest local Euclidean space of the closest submap using a projection between the global coordinate system and the closest local Euclidean space.

According to some non-limiting embodiments or aspects, provided is a computing system including one or more processors programmed or configured to: obtain map data associated with a map of a geographic location including one or more roadways, the map including a first submap represented by a first local Euclidean space and a second submap represented by a second local Euclidean space; determine, a route that includes a first roadway in the first submap and a second roadway in the second submap using a first projection between a global coordinate system and the first local Euclidean space and a second projection between the global coordinate system and the second local Euclidean space; and provide the route to an autonomous vehicle (AV) for driving on the first roadway and the second roadway.

In some non-limiting embodiments or aspects, the route includes a map represented by the global coordinate system.

In some non-limiting embodiments or aspects, the first projection includes a first transverse Mercator centered at a first point in the global coordinate system, and the second projection includes a second transverse Mercator centered at a second point in the global coordinate system that is different than the first point.

In some non-limiting embodiments or aspects, the first submap includes a first portion located in a first Universal Transverse Mercator (UTM) zone, and the second submap includes a second portion located in a second UTM zone different than the first UTM zone.

In some non-limiting embodiments or aspects, the first point includes first latitude and longitude coordinates, the second point includes second latitude and longitude coordinates, the first point corresponds to an origin point of the first submap, and the second point corresponds to an origin point of the second submap.

In some non-limiting embodiments or aspects, the one or more processors are further programmed or configured to: determine a transform between the first local Euclidean space and the second local Euclidean space; and determine the route based on the transform.

In some non-limiting embodiments or aspects, the route further includes the one or more roadways in at least one third submap between the first submap and the second submap, the third submap being represented by a third local Euclidean space, and the one or more processors are further programmed or configured to: transform a first local point in a first local Euclidean space to a first global point in the global coordinate system based on the first projection; transform a second local point in the second local Euclidean space to a second global point in the global coordinate system based on the second projection; transform a third local point in the third local Euclidean space to a third global point in the global coordinate system based on a third projection between the global coordinate system and the third local Euclidean space; and determine a position of the first local point relative to the second local point and the third local point in the global coordinate system.

In some non-limiting embodiments or aspects, the one or more processors are further programmed or configured to: receive a global point including a latitude coordinate and a longitude coordinate; determine, in the map, a closest submap associated with the global point, the closest submap being represented by a closest local Euclidean space; and determine a local point in the closest local Euclidean space of the closest submap using a projection between the global coordinate system and the closest local Euclidean space.

According to some non-limiting embodiments or aspects, provided is an autonomous vehicle (AV) including a vehicle computing system including one or more processors, the vehicle computing system programmed or configured to: obtain map data associated with a map of a geographic location including one or more roadways, the map including a first submap represented by a first local Euclidean space and a second submap represented by a second local Euclidean space; determine a route that includes a first roadway in the first submap and a second roadway in the second submap using a first projection between a global coordinate system and the first local Euclidean space and a second projection between the global coordinate system and the second local Euclidean space; and control at least one functionality of the AV on the first roadway and the second roadway based on the route.

In some non-limiting embodiments or aspects, the vehicle computing system is further programmed or configured to: receive a global point including a latitude coordinate and a longitude coordinate; determine in the map a closest submap associated with the global point, the closest submap being represented by a closest local Euclidean space; determine a local point in the closest local Euclidean space using a projection between the global coordinate system and the closest local Euclidean space; and control the at least one functionality of the AV based on the local point.

In some non-limiting embodiments or aspects, the map data is associated with a transform between the first local Euclidean space of the first submap and the second local Euclidean space of the second submap, and the vehicle computing system is further programmed or configured to: determine the route based on the transform by transforming a local point in the second local Euclidean space of the second submap to the first local Euclidean space of the first submap based on the transform; and control the at least one functionality of the AV based on the transformed local point.

Further non-limiting embodiments or aspects are set forth in the following numbered clauses:

Clause 1. A method comprising: obtaining, with a computer system comprising one or more processors, map data associated with a map of a geographic location including one or more roadways, wherein the map includes a first submap represented by a first local Euclidean space and a second submap represented by a second local Euclidean space; determining, with the computer system, a route that includes a first roadway in the first submap and a second roadway in the second submap using a first projection between a global coordinate system and the first local Euclidean space and a second projection between the global coordinate system and the second local Euclidean space; and providing, with the computer system, the route to an autonomous vehicle (AV) for driving on the first roadway and the second roadway.

Clause 2. The method of clause 1, wherein the route includes a map represented by the global coordinate system.

Clause 3. The method of any of clauses 1 and 2, wherein the first projection includes a first transverse Mercator centered at a first point in the global coordinate system, and wherein the second projection includes a second transverse Mercator centered at a second point in the global coordinate system that is different than the first point.

Clause 4. The method of any of clauses 1-3, wherein the first submap includes a first portion located in a first Universal Transverse Mercator (UTM) zone, and wherein the second submap includes a second portion located in a second UTM zone different than the first UTM zone.

Clause 5. The method of any of clauses 1-4, wherein the first point includes a first latitude coordinate and a first longitude coordinate, and wherein the second point includes a second latitude coordinate and a second longitude coordinate.

Clause 6. The method of any of clauses 1-5, wherein the first point corresponds to an origin point of the first local Euclidean space, and wherein the second point corresponds to an origin point of the second local Euclidean space.

Clause 7. The method of any of clauses 1-6, wherein determining the route further comprises: determining, with the computer system, a transform between the first local Euclidean space and the second local Euclidean space; and determining, with the computer system, the route based on the transform.

Clause 8. The method of any of clauses 1-7, wherein the route further includes the one or more roadways in at least one third submap between the first submap and the second submap, wherein the third submap is represented by a third local Euclidean space, and wherein determining the route further comprises: transforming, with the computer system, a first local point in the first local Euclidean space to a first global point in the global coordinate system based on the first projection; transforming, with the computer system, a second local point in the second local Euclidean space to a second global point in the global coordinate system based on the second projection; transforming, with the computer system, a third local point in the third local Euclidean space to a third global point in the global coordinate system based on a third projection between the global coordinate system and the third local Euclidean space; and determining, with the computer system, a position of the first local point relative to the second local point and the third local point in the global coordinate system.

Clause 9. The method of any of clauses 1-8, wherein determining the route further comprises: receiving, with the computer system, a global point including a latitude coordinate and a longitude coordinate; determining in the map, with the computer system, a closest submap associated with the global point, wherein the closest submap is represented by a closest local Euclidean space; and determining, with the computer system, a local point in the closest local Euclidean space of the closest submap using a projection between the global coordinate system and the closest local Euclidean space.

Clause 10. A computing system comprising: one or more processors programmed or configured to: obtain map data associated with a map of a geographic location including one or more roadways, wherein the map includes a first submap represented by a first local Euclidean space and a second submap represented by a second local Euclidean space; determine, a route that includes a first roadway in the first submap and a second roadway in the second submap using a first projection between a global coordinate system and the first local Euclidean space and a second projection between the global coordinate system and the second local Euclidean space; and provide the route to an autonomous vehicle (AV) for driving on the first roadway and the second roadway.

Clause 11. The computing system of clause 10, wherein the route includes a map represented by the global coordinate system.

Clause 12. The computing system of any of clauses 10 and 11, wherein the first projection includes a first transverse Mercator centered at a first point in the global coordinate system, and wherein the second projection includes a second transverse Mercator centered at a second point in the global coordinate system that is different than the first point.

Clause 13. The computing system of any of clauses 10-12, wherein the first submap includes a first portion located in a first Universal Transverse Mercator (UTM) zone, and wherein the second submap includes a second portion located in a second UTM zone different than the first UTM zone.

Clause 14. The computing system of any of clauses 10-13, wherein the first point includes a first latitude coordinate and a first longitude coordinate, wherein the second point includes a second latitude coordinate and a second longitude coordinate, wherein the first point corresponds to an origin point of the first submap, and wherein the second point corresponds to an origin point of the second submap.

Clause 15. The computing system of any of clauses 10-14, wherein the one or more processors are further programmed or configured to: determine a transform between the first local Euclidean space and the second local Euclidean space; and determine the route based on the transform.

Clause 16. The computing system of any of clauses 10-15, wherein the route further includes the one or more roadways in at least one third submap between the first submap and the second submap, wherein the third submap is represented by a third local Euclidean space, and wherein the one or more processors are further programmed or configured to: transform a first local point in a first local Euclidean space to a first global point in the global coordinate system based on the first projection; transform a second local point in the second local Euclidean space to a second global point in the global coordinate system based on the second projection; transform a third local point in the third local Euclidean space to a third global point in the global coordinate system based on a third projection between the global coordinate system and the third local Euclidean space; and determine a position of the first local point relative to the second local point and the third local point in the global coordinate system.

Clause 17. The computing system of any of clauses 10-16, wherein the one or more processors are further programmed or configured to: receive a global point including a latitude coordinate and a longitude coordinate; determine, in the map, a closest submap associated with the global point, wherein the closest submap is represented by a closest local Euclidean space; and determine a local point in the closest local Euclidean space of the closest submap using a projection between the global coordinate system and the closest local Euclidean space.

Clause 18. An autonomous vehicle (AV) comprising: a vehicle computing system comprising one or more processors, wherein the vehicle computing system is programmed or configured to: obtain map data associated with a map of a geographic location including one or more roadways, wherein the map includes a first submap represented by a first local Euclidean space and a second submap represented by a second local Euclidean space; determine a route that includes a first roadway in the first submap and a second roadway in the second submap using a first projection between a global coordinate system and the first local Euclidean space and a second projection between the global coordinate system and the second local Euclidean space; and control at least one functionality of the AV on the first roadway and the second roadway based on the route.

Clause 19. The AV of clause 18, wherein the vehicle computing system is further programmed or configured to: receive a global point including a latitude coordinate and a longitude coordinate; determine in the map a closest submap associated with the global point, wherein the closest submap is represented by a closest local Euclidean space; determine a local point in the closest local Euclidean space using a projection between the global coordinate system and the closest local Euclidean space; and control the at least one functionality of the AV based on the local point.

Clause 20. The AV of any of clauses 18 and 19, wherein the map data is associated with a transform between the first local Euclidean space of the first submap and the second local Euclidean space of the second submap, and wherein the vehicle computing system is further programmed or configured to: determine the route based on the transform by transforming a local point in the second local Euclidean space of the second submap to the first local Euclidean space of the first submap based on the transform; and control the at least one functionality of the AV based on the transformed local point.

DETAILED DESCRIPTION

Figure 1:
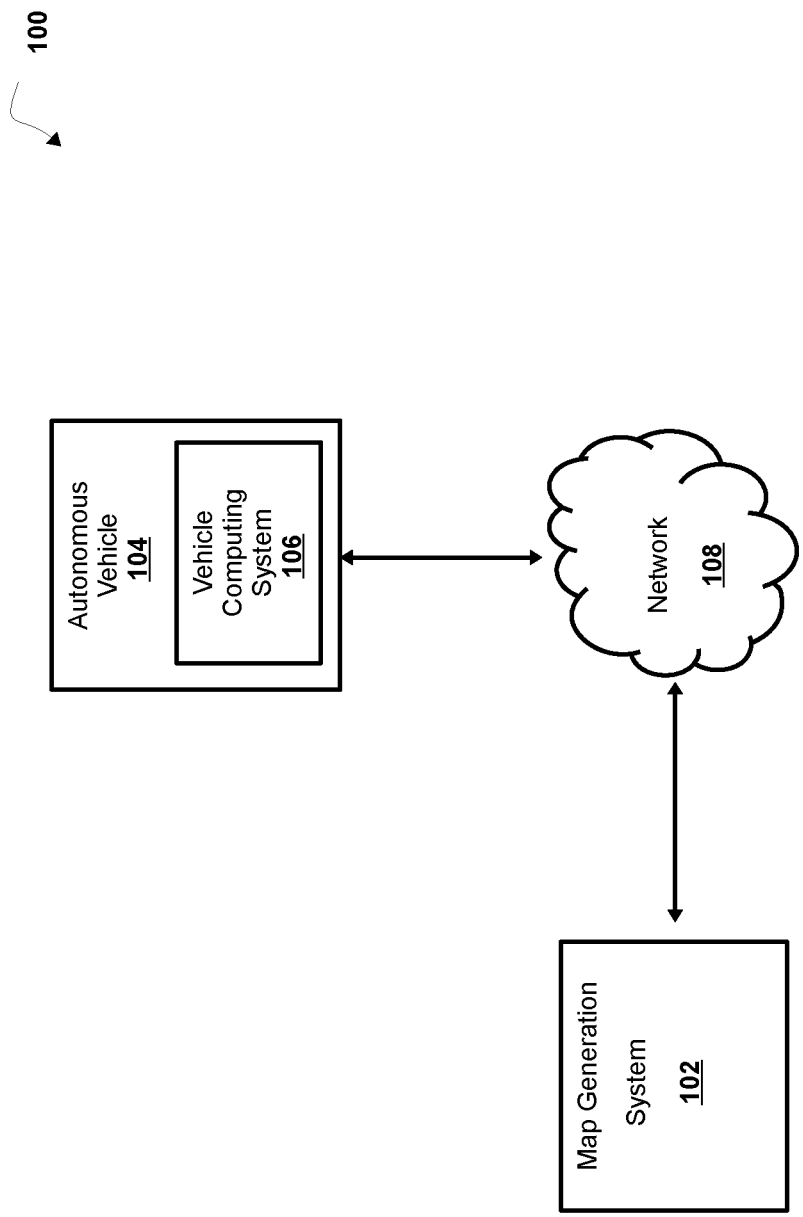
FIG. 1 is a diagram of a non-limiting embodiment of an environment in which systems and/or methods, described herein, can be implemented.

The following detailed description of non-limiting embodiments refers to the accompanying drawings. The same reference numbers in different drawings may identify the same or similar elements.

In some non-limiting embodiments, a map of a geographic location is used for routing an autonomous vehicle (AV) on roadways specified in the map. For example, a route including one or more lanes on one or more roadway segments is determined for the AV between a pick-up location (or a current location) and a destination location based on the map. In some non-limiting embodiments, a map includes one or more submaps. For example, a submap is a coordinate system with a pose that has an origin at a point of a global coordinate system (e.g., a latitude and a longitude point at sea level, etc.). As an example, a submap includes a local Euclidean space which is a unique projection into the world at the zero or origin point of the coordinate frame of the submap, and a geographic projection is used to transform global coordinates on the mostly spherical world (e.g., latitude and longitude coordinates, etc.) to and from the local Euclidean space of the submap.

However, standard projection systems do not allow global coordinates to be consistently transformed to local Euclidean spaces of submaps, and standard projection systems introduce a significant projection error when transforming local points in local Euclidean spaces of submaps to global coordinates. For example, using Universal Transverse Mercator (UTM) in a fixed zone for a map including multiple submaps (e.g., a map of a city represented by multiple submaps) as a global projection, and converting incoming latitude and longitude points into UTM and into submaps, results in a projection of each submap being a translated UTM projection, which causes map relative coordinates to be converted to and from UTM by adding an X/Y vector. As an example, each submap does not contain UTM zone data, which is assumed to be in the same zone as the rest of the map, and contains a latitude and a longitude point corresponding to its coordinate center point, which is the single point where the projection of that submap is accurate, but as the map relative coordinates increase in magnitude, the map relative coordinates accrue projection error based on the distance of the submap from the center of the UTM zone in which the submap is located. In this way, transforms between submaps that are in different UTM zones may not be created, geographic locations which span multiple UTM zones may not be accurately represented, routing across submaps in multiple UTM zones may not be performed accurately, UTM transforms embedded in submaps may increase processing time and resources required to read and modify the submaps, distances between map relative points may not be accurately preserved, and/or an error associated with an accurate representation of North may be introduced. Accordingly, standard projection systems provide less accurate maps, mapping systems and/or routing systems that introduce errors, increase processing times and resources for routing, and/or inhibit creation and/or representation of certain geographic locations.

As disclosed herein, in some non-limiting embodiments, a map generation system obtains map data associated with a map of a geographic location including one or more roadways, and the map includes a first submap represented by a first local Euclidean space and a second submap represented by a second local Euclidean space. The map generation system determines a route (e.g., a route, a map including a route, a route represented as a map, etc.) that includes a first roadway in the first submap and a second roadway in the second submap using a first projection between a global coordinate system and the first local Euclidean space and a second projection between the global coordinate system and the second local Euclidean space. The map generation system provides the route to an AV for driving on the first roadway and the second roadway. In this way, transforms between submaps that are in different UTM zones can be created and/or used, geographic locations which span multiple UTM zones can be more accurately represented, routing across submaps in multiple UTM zones can be performed more accurately, processing times and resources for reading and modifying submaps can be decreased, distances between map relative points can be more accurately preserved, and an error associated with an accurate representation of North can be reduced and/or eliminated. Accordingly, determining projections (e.g., transverse Mercators, etc.) at arbitrary global points (e.g., latitude and longitude points, etc.) associated with submaps (e.g., origin points of submaps) provides a more accurate mapping system that introduces fewer errors, reduces processing time and resources for routing, and/or enables creation and/or representation of more and larger geographic locations. For example, error characteristics of projections may accrue from the arbitrary center points of submaps, rather than one of the fixed center points of UTM zones.

As disclosed herein, in some non-limiting embodiments, a vehicle computing system of an AV obtains map data associated with a map of a geographic location including one or more roadways. The map includes a first submap represented by a first local Euclidean space and a second submap represented by a second local Euclidean space. The vehicle computing system determines a route (e.g., a route, a map including a route, a route represented as a map, etc.) that includes a first roadway in the first submap and a second roadway in the second submap using a first projection between a global coordinate system and the first local Euclidean space and a second projection between the global coordinate system and the second local Euclidean space. The vehicle computing system controls at least one functionality of the AV (e.g., controls driving of the AV, etc.) on the first roadway and the second roadway based on the route. In this way, the vehicle computing system can create and/or use transforms between submaps that are in different UTM zones, more accurately represent geographic locations which span multiple UTM zones, more accurately route the AV across submaps in multiple UTM zones, reduce processing time and resources required to read and modify submaps, more accurately preserve distances between map relative points in submaps, and/or reduce and/or eliminate an error associated with an accurate representation of North. Accordingly, using projections (e.g., transverse Mercators, etc.) determined at arbitrary global points (e.g., latitude and longitude points) associated with submaps (e.g., origin points of submaps) enables a vehicle computing system to introduce fewer routing errors, reduce processing time and resources for routing, and/or more accurately represent certain geographic locations. For example, the vehicle computing system can more quickly determine a submap in which the AV is currently located, which reduces a bootstrapping time associated with a localization functionality or system of the AV.

In some non-limiting embodiments, a geographic projection transforms coordinates on the mostly spherical world to and from a Euclidean space. For example, a geographic projection takes into account a model of the world, which is not quite a sphere. As an example, a geographic projection reduces a globe to a plane, and becomes less accurate over distance.

In some non-limiting embodiments, a latitude and longitude point, which is sometimes improperly referred to as GPS (which implies an observation method), is the correct and accurate representation of a point on the globe. For example, latitude and longitude points can be used as global points to refer to and/or represent actual real world locations and to import and export data (e.g., to and from a map generation system, a vehicle computing system, etc.).

In some non-limiting embodiments, Earth Centered Earth Fixed (ECEF) is used to refer to and/or represent a point in the world. For example, ECEF is not technically a projection, but is a global Euclidean coordinate system that imagines the Earth at the center of a cube, with the center point at the center of the Earth, Z pointing to the North Pole, and X towards a fixed point on the Equator. ECEF gives an X/Y/Z point to any point on Earth in a single frame of reference, but is non-planar with Z not pointing up (except at the North Pole).

In some non-limiting embodiments, UTM, which is a standard projection system involving 60 UTM zones in the world divided into Northern and Southern hemispheres, is used to refer to and/or represent a point in the world. For example, each UTM zone is a plane from ~200,000 m to ~800,000 m in 6 degree bands along X running from 80 degrees south to 84 degrees north in Y. As an example, UTM is a common standard for locating points in the world using X/Y coordinates; however, UTM zones become less accurate towards the edges, and transformations between different zones significantly increase processing times and loads. In some non-limiting embodiments, UTM is used to represent Euclidean data over an entire city and/or to perform planar search over lane graph elements.

Referring now to FIG. 1, FIG. 1 is a diagram of a non-limiting embodiment of an environment 100 in which systems and/or methods, described herein, can be implemented. As shown in FIG. 1, environment 100 includes map generation system 102, autonomous vehicle 104 including the vehicle computing system 106, and network 108. Systems and/or devices of environment 100 can interconnect via wired connections, wireless connections, or a combination of wired and wireless connections.

In some non-limiting embodiments, map generation system 102 and/or autonomous vehicle 104 include one or more devices capable of receiving, storing, obtaining, and/or providing map data (e.g., map data, submap data, etc.) associated with a map (e.g., a map, a submap, etc.) of a geographic location (e.g., a country, a state, a city, a portion of a city, a township, a portion of a township, etc.). For example, maps are used for routing autonomous vehicle 104 on a roadway specified in the map.

In some non-limiting embodiments, map generation system 102 includes one or more devices capable of obtaining map data associated with a map of a geographic location including one or more roadways, the map including a first submap represented by a first local Euclidean space and a second submap represented by a second local Euclidean space; determining a route that includes a first roadway in the first submap and a second roadway in the second submap using a first projection between a global coordinate system and the first local Euclidean space and a second projection between the global coordinate system and the second local Euclidean space; and providing the route to autonomous vehicle 104 for driving on the first roadway and the second roadway. For example, map generation system 102 can include one or more computing systems including one or more processors (e.g., one or more servers, etc.).

In some non-limiting embodiments, map generation system 102 includes a service platform for providing services for an application platform, such as a transportation platform, a ride sharing platform, a delivery service platform, a courier service platform, or the like, and includes one or more devices capable of communicating with a user device to provide user access to an application platform. As an example, map generation system 102 communicates with vehicle computing system 106 to provision services associated with an application platform, such as a transportation platform, a ride sharing platform, a delivery service platform, a courier service platform, and/or other service platforms. In some non-limiting embodiments, map generation system 102 is associated with a central operations system and/or an entity associated with autonomous vehicle 104 and/or an application platform such as, for example, an AV owner, an AV manager, a fleet operator, a service provider, and/or the like.

In some non-limiting embodiments, autonomous vehicle 104 includes one or more devices capable of obtaining map data associated with a map of a geographic location including one or more roadways, the map including a first submap represented by a first local Euclidean space and a second submap represented by a second local Euclidean space; determining a route that includes a first roadway in the first submap and a second roadway in the second submap using a first projection between a global coordinate system and the first local Euclidean space and a second projection between the global coordinate system and the second local Euclidean space; and controlling at least one functionality (e.g., autonomous driving or travel, etc.) of autonomous vehicle 104 on the first roadway and the second roadway based on the route. For example, autonomous vehicle 104 can include one or more computing systems including one or more processors (e.g., one or more servers, etc.). Further details regarding non-limiting embodiments of autonomous vehicle 104 are provided below with regard to FIG. 2.

In some non-limiting embodiments, network 108 includes one or more wired and/or wireless networks. For example, network 108 includes a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices and/or networks, fewer systems, devices, and/or networks, different systems, devices and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100.

Figure 2:
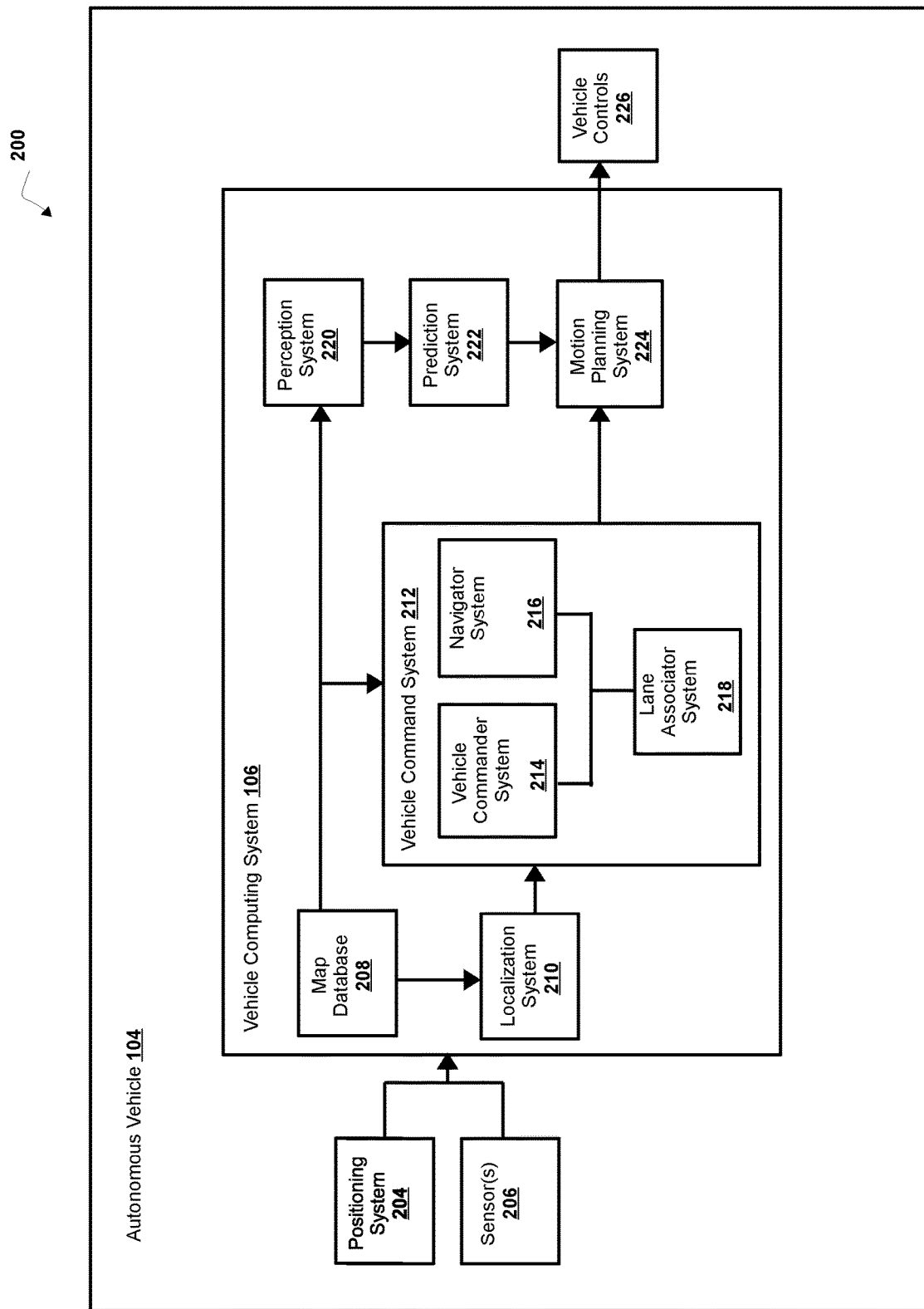
FIG. 2 is a diagram of a non-limiting embodiment of a system for controlling an autonomous vehicle (AV) shown in FIG. 1.

Referring now to FIG. 2, FIG. 2 is a diagram of a non-limiting embodiment of a system 200 for controlling autonomous vehicle 104. As shown in FIG. 2, vehicle computing system 106 includes vehicle command system 212, perception system 220, prediction system 222, and motion planning system 224 that cooperate to perceive a surrounding environment of autonomous vehicle 104, determine a motion plan and control the motion (e.g., the direction of travel) of autonomous vehicle 104 accordingly.

In some non-limiting embodiments, vehicle computing system 106 is connected to or includes positioning system 204. In some non-limiting embodiments, positioning system 204 determines a position (e.g., a current position, a past position, etc.) of autonomous vehicle 104. In some non-limiting embodiments, positioning system 204 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. In some non-limiting embodiments, the position of autonomous vehicle 104 is used by vehicle computing system 106.

In some non-limiting embodiments, vehicle computing system 106 receives sensor data from one or more sensors 206 that are coupled to or otherwise included in autonomous vehicle 104. For example, one or more sensors 206 includes a Light Detection and Ranging (LIDAR) system, a Radio Detection and Ranging (RADAR) system, one or more cameras (e.g., visible spectrum cameras, infrared cameras, etc.), and/or the like. In some non-limiting embodiments, the sensor data includes data that describes a location of objects within the surrounding environment of the autonomous vehicle 104. In some non-limiting embodiments, one or more sensors 206 collect sensor data that includes data that describes a location (e.g., in three-dimensional space relative to the autonomous vehicle 104) of points that correspond to objects within the surrounding environment of autonomous vehicle 104.

In some non-limiting embodiments, the sensor data includes a location (e.g., a location in three-dimensional space relative to the LIDAR system) of a number of points (e.g., a point cloud) that correspond to objects that have reflected a ranging laser. In some non-limiting embodiments, the LIDAR system measures distances by measuring a Time of Flight (TOF) that a short laser pulse takes to travel from a sensor of the LIDAR system to an object and back, and the LIDAR system calculates the distance of the object to the LIDAR system based on the known speed of light. In some non-limiting embodiments, map data includes LIDAR point cloud maps associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

In some non-limiting embodiments, the sensor data includes a location (e.g., a location in three-dimensional space relative to the RADAR system) of a number of points that correspond to objects that have reflected a ranging radio wave. In some non-limiting embodiments, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments, the RADAR system provides information about the location and/or the speed of an object relative to the RADAR system based on the radio waves.

In some non-limiting embodiments, image processing techniques (e.g., range imaging techniques such as, for example, structure from motion, structured light, stereo triangulation, etc.) can be performed by system 200 to identify a location (e.g., in three-dimensional space relative to the one or more cameras) of a number of points that correspond to objects that are depicted in images captured by one or more cameras. Other sensors can identify the location of points that correspond to objects as well.

In some non-limiting embodiments, map database 208 provides detailed information associated with the map, features of the roadway in the geographic location, and information about the surrounding environment of the autonomous vehicle 104 for the autonomous vehicle 104 to use while driving (e.g., traversing a route, planning a route, determining a motion plan, controlling the autonomous vehicle, etc.).

In some non-limiting embodiments, vehicle computing system 106 receives a vehicle pose from localization system 210 based on one or more sensors 206 that are coupled to or otherwise included in autonomous vehicle 104. In some non-limiting embodiments, the localization system 210 includes a LIDAR localizer, a low quality pose localizer, and/or a pose filter. For example, the localization system uses a pose filter that receives and/or determines one or more valid pose estimates (e.g., not based on invalid position data, etc.) from the LIDAR localizer and/or the low quality pose localizer, for determining a map-relative vehicle pose. For example, low quality pose localizer determines a low quality pose estimate in response to receiving position data from positioning system 204 for operating (e.g., routing, navigating, controlling, etc.) the autonomous vehicle 104 under manual control (e.g., in a coverage lane). In some non-limiting embodiments, LIDAR localizer determines a LIDAR pose estimate in response to receiving sensor data (e.g., LIDAR data, RADAR data, etc.) from sensors 206 for operating (e.g., routing, navigating, controlling, etc.) the autonomous vehicle 104 under autonomous control (e.g. in an AV lane).

In some non-limiting embodiments vehicle command system 212 includes vehicle commander system 214, navigator system 216, and lane associator system 218 that cooperate to route and/or navigate the autonomous vehicle 104 in a geographic location. In some non-limiting embodiments, vehicle commander system 214 provides tracking of a current objective of the autonomous vehicle 104, including a current service, a target pose, and/or a coverage plan (e.g., development testing, etc.). In some non-limiting embodiments, navigator system 216 determines and/or provides a route plan for the autonomous vehicle 104 based on the current state of the autonomous vehicle 104, map data (e.g., lane graph, etc.), and one or more vehicle commands (e.g., a target pose). For example, navigator system 216 determines a route plan (e.g., plan, re-plan, deviation, etc.) including one or more lanes (e.g., current lane, future lane, etc.) in one or more roadways the autonomous vehicle 104 may traverse on a route to a destination (e.g., target, trip drop-off, etc.).

In some non-limiting embodiments, navigator system 216 determines a route plan based on one or more lanes received from lane associator system 218. In some non-limiting embodiments, lane associator determines one or more lanes of a route in response to receiving a vehicle pose from the localization system 210. For example, the lane associator system 218 determines, based on the vehicle pose, that the autonomous vehicle 104 is on a coverage lane, and in response to determining that the autonomous vehicle 104 is on the coverage lane, determines one or more candidate lanes (e.g. routable lanes) within a distance of the vehicle pose associated with the autonomous vehicle 104. For example, the lane associator system 218 determines, based on the vehicle pose, that the autonomous vehicle 104 is on an AV lane, and in response to determining that the autonomous vehicle 104 is on the AV lane, determines one or more candidate lanes (e.g. routable lanes) within a distance of the vehicle pose associated with the autonomous vehicle 104. In some non-limiting embodiments, navigator system 216 generates a cost function for each of one or more candidate lanes the autonomous vehicle 104 may traverse on a route to a destination. For example, navigator system 216 generates the cost function that describes a cost (e.g., a cost over a time period) of following (e.g., adhering to) one or more lanes that may be used to reach a target pose.

In some non-limiting embodiments, perception system 220 detects and/or tracks objects (e.g., vehicles, pedestrians, bicycles, and the like) that are proximate to (e.g., in proximity to the surrounding environment of) the autonomous vehicle 104 over a time period. In some non-limiting embodiments, perception system 220 can retrieve (e.g., obtain) map data from the map database 208 that provides detailed information about the surrounding environment of the autonomous vehicle 104.

In some non-limiting embodiments, perception system 220 determines one or more objects that are proximate to autonomous vehicle 104 based on sensor data received from one or more sensors 206 and/or map data from map database 208. For example, perception system 220 determines, for the one or more objects that are proximate, state data associated with a state of such object. In some non-limiting embodiments, the state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

In some non-limiting embodiments, perception system 220 determines state data for an object over a number of iterations of determining state data. For example, perception system 220 updates the state data for each object of a plurality of objects during each iteration.

In some non-limiting embodiments, prediction system 222 receives the state data associated with one or more objects from perception system 220. Prediction system 222 predicts one or more future locations for the one or more objects based on the state data. For example, prediction system 222 predicts the future location of each object of a plurality of objects within a time period (e.g., 5 seconds, 10 seconds, 20 seconds, etc.). In some non-limiting embodiments, prediction system 222 predicts that an object will adhere to the object's direction of travel according to the speed of the object. In some non-limiting embodiments, prediction system 222 uses machine learning techniques or modeling techniques to make a prediction based on state data associated with an object.

In some non-limiting embodiments, motion planning system 224 determines a motion plan for autonomous vehicle 104 based on a prediction of a location associated with an object provided by prediction system 222 and/or based on state data associated with the object provided by perception system 220. For example, motion planning system 224 determines a motion plan (e.g., an optimized motion plan) for the autonomous vehicle 104 that causes autonomous vehicle 104 to travel relative to the object based on the prediction of the location for the object provided by prediction system 222 and/or the state data associated with the object provided by perception system 220.

In some non-limiting embodiments, motion planning system 224 receives a route plan as a command from the navigator system 216. In some non-limiting embodiments, motion planning system 224 determines a cost function for each of one or more motion plans of a route for autonomous vehicle 104 based on the locations and/or predicted locations of one or more objects. For example, motion planning system 224 determines the cost function that describes a cost (e.g., a cost over a time period) of following (e.g., adhering to) a motion plan (e.g., a selected motion plan, an optimized motion plan, etc.). In some non-limiting embodiments, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments, motion planning system 224 determines a cost of following a motion plan. For example, motion planning system 224 determines a motion plan for autonomous vehicle 104 based on one or more cost functions. In some non-limiting embodiments, motion planning system 224 determines a motion plan (e.g., a selected motion plan, an optimized motion plan, a preferred motion plan, etc.) that minimizes a cost function. In some non-limiting embodiments, motion planning system 224 provides a motion plan to vehicle controls 226 (e.g., a device that controls acceleration, a device that controls steering, a device that controls braking, an actuator that controls gas flow, etc.) to implement the motion plan.

Figure 3:
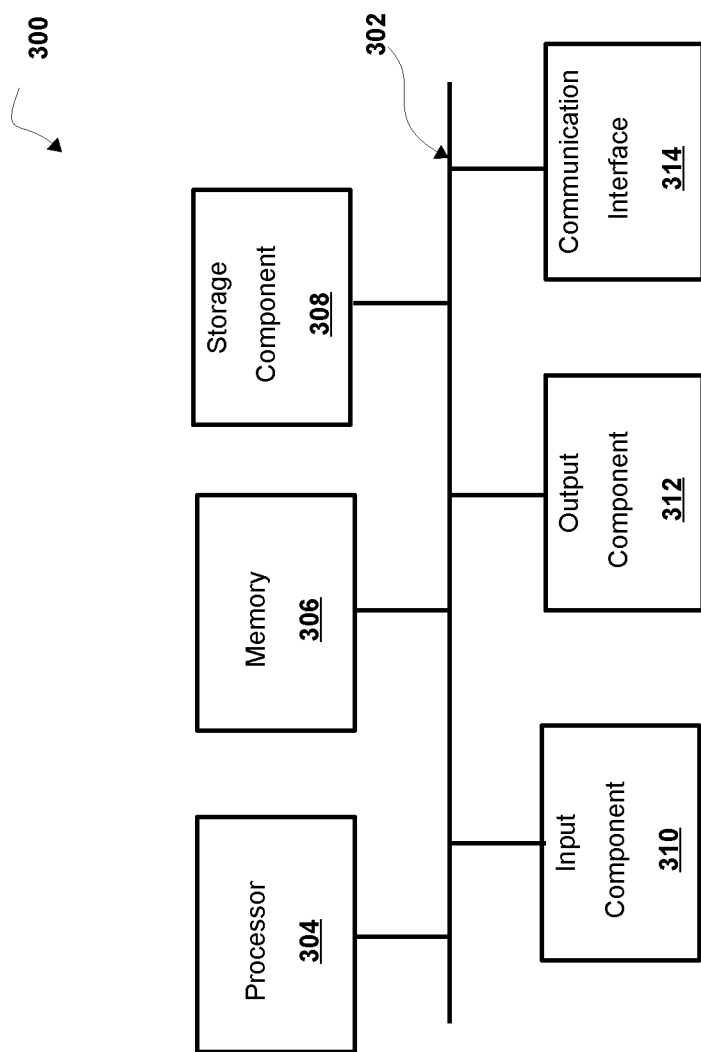
FIG. 3 is a diagram of a non-limiting embodiment of components of one or more devices of FIGS. 1 and 2.

Referring now to FIG. 3, FIG. 3 is a diagram of example components of a device 300. Device 300 can correspond to one or more devices of map generation system 102 and/or one or more devices (e.g., one or more devices of a system) of autonomous vehicle 104. In some non-limiting embodiments, one or more devices of map generation system 102 and/or one or more devices (e.g., one or more devices of a system) of autonomous vehicle 104 can include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments, processor 304 is implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
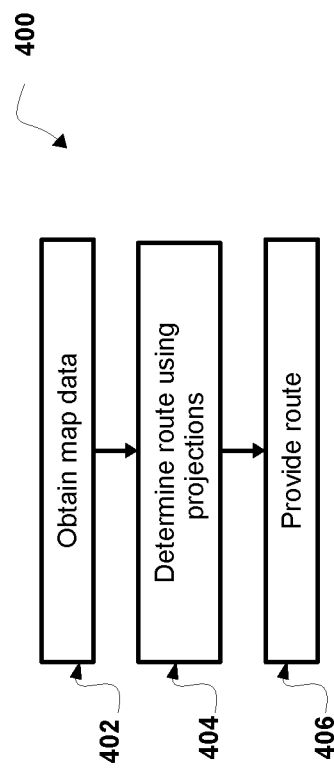
FIG. 4 is a flowchart of a non-limiting embodiment of a process for providing a route.

Referring now to FIG. 4, FIG. 4 is a flowchart of a non-limiting embodiment of a process 400 for providing a route. In some non-limiting embodiments, one or more of the steps of process 400 are performed (e.g., completely, partially, etc.) by autonomous vehicle 104 (e.g., one or more devices of autonomous vehicle 104). In some non-limiting embodiments, one or more of the steps of process 400 are performed (e.g., completely, partially, etc.) by another device or a group of devices separate from or including autonomous vehicle 104, such as map generation system 102 (e.g., one or more devices of map generation system 102).

As shown in FIG. 4, at step 402, process 400 includes obtaining map data associated with a map of a geographic location including one or more roadways. For example, map generation system 102 and/or autonomous vehicle 104 (e.g., vehicle computing system 106, etc.) obtains map data associated with a map of a geographic location including one or more roadways. As an example, map generation system 102 and/or autonomous vehicle 104 (e.g., vehicle computing system 106, etc.) obtains the map data from a database located in map generation system 102, a database remote from map generation system 102, a database associated with autonomous vehicle 104, a database located in autonomous vehicle 104 (e.g., map database 208, etc.), a database remote from autonomous vehicle 104, and/or the like.

In some non-limiting embodiments, map data includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. In some non-limiting embodiments, a map of a geographic location includes one or more routes that include one or more roadways. In some non-limiting embodiments, map data associated with a map of the geographic location associates the one or more roadways with an indication of whether an AV can travel on that roadway.

In some non-limiting embodiments, a road refers to a paved or otherwise improved path between two places that allows for travel by a vehicle (e.g., autonomous vehicle 104). Additionally, or alternatively, a road includes a roadway and a sidewalk in proximity to (e.g., adjacent, near, next to, touching, etc.) the roadway. In some non-limiting embodiments, a roadway includes a portion of road on which a vehicle is intended to travel and is not restricted by a physical barrier or by separation so that the vehicle is able to travel laterally. Additionally, or alternatively, a roadway (e.g., one or more roadway segments) includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments, a roadway is connected to another roadway, for example, a lane of a roadway is connected to another lane of the roadway and/or a lane of the roadway is connected to a lane of another roadway.

In some non-limiting embodiments, a roadway is associated with map data (e.g., map data, submap data, etc.) that defines one or more attributes of (e.g., metadata associated with) the roadway (e.g., attributes of a roadway in a geographic location, attributes of a segment or extent of a roadway, attributes of a lane of a roadway, etc.). In some non-limiting embodiments, an attribute of a roadway includes a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

In some non-limiting embodiments, map data includes LIDAR point cloud maps (e.g., map point data, etc.) associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of a map.

In some non-limiting embodiments, a map includes a first submap represented by a first local Euclidean space and a second submap represented by a second local Euclidean space. For example, a map can include a plurality of submaps, and a submap of the plurality of submaps is represented by a local Euclidean space, which may be different than a local Euclidean space of one or more other submaps of the plurality of submaps. As an example, a map can include a collection of submaps and is represented as a 2D array associated with information layers, and each layer is in each submap and each submap has each layer.

In some non-limiting embodiments, a submap is defined by a latitude and longitude point at an origin point of the submap, a projection (e.g., an alignment, etc.), one or more neighboring submaps associated as neighbors to the submap, an extent that defines where the submap extends to in space, a lane graph including a collection of vector data about roadways, lanes, and/or other features and controls, and/or information used by map generation system 102 and/or vehicle computing system 106 to represent the ground truth of the real world. For example, a submap is a coordinate system with a pose that has an origin at a latitude and a longitude point at sea level, and a submap is connected to one or more neighboring submaps through transformations. As an example, a submap is represented by a local Euclidean space, which is a unique projection into the world at the zero point of the coordinate frame of that submap, and transforms between the projection of that submap and projections of neighboring submaps of that submap, as well as data to un-project that submap back onto the globe (e.g., back to a latitude and a longitude coordinate system, etc.), are associated with and/or stored in association with that submap. For example, a geographic projection is used to transform global coordinates on the mostly spherical world (e.g., latitude and longitude coordinates, etc.) to a local Euclidean space of a submap and transform coordinates in the local Euclidean space of the submap to global coordinates on the mostly spherical world. For example, a transform is used to transform coordinates in a local Euclidean space of a submap to other coordinates in another local Euclidean space of another submap and/or other coordinates in another projection system (e.g., UTM, etc.).

In some non-limiting embodiments, map generation system 102 and/or autonomous vehicle 104 determine a geographic (or map) projection between a submap represented by a local Euclidean space and a global coordinate system. For example, map generation system 102 and/or autonomous vehicle 104 determine, construct, and/or generate a geographic projection (e.g., a transverse Mercator, etc.) centered at a point in a global coordinate system (e.g., a latitude and a longitude point, etc.) that corresponds to an origin point of a submap represented by a local Euclidean space, which provides a transform of coordinates in the global coordinate system to and from the local Euclidean space of the submap. As an example, a first projection between the global coordinate system and the first local Euclidean space can include a first transverse Mercator centered at a first point in the global coordinate system (e.g., first latitude and longitude coordinates, etc.), and a second projection between the global coordinate system and the second local Euclidean space can include a second transverse Mercator centered at a second point in the global coordinate system (e.g., second latitude and longitude coordinates, etc.) that is different than the first point. For example, the first point corresponds to an origin point of the first local Euclidean space, and the second point corresponds to an origin point of the second local Euclidean space. It is noted that algorithms for geographic (or map) projections including the transverse Mercator projection are well-known in the art and, therefore, a detailed description thereof is omitted in the interest of brevity.

In some non-limiting embodiments, map generation system 102 and/or autonomous vehicle 104 determine a transform between local Euclidean spaces of submaps and/or a transform between a local Euclidean space of a submap and a global projection or coordinate system (e.g., ECEF, UTM, etc.). For example, map generation system 102 and/or autonomous vehicle 104 can use the Geospatial Data Abstraction Library (GDAL) including the GDAL/OGR simple features library, to determine a transform between local Euclidean spaces of submaps and/or a transform between a local Euclidean space of a submap and a global projection or coordinate system (e.g., ECEF, UTM, etc.), for example, based on projections (e.g., transverse Mercators, etc.) of the submaps. As an example, transforms include 3D transforms that convert individual submaps between various projections, such as a transform from first submap relative coordinates to second submap relative coordinates (e.g., between a first local Euclidean space and a second local Euclidean space) and/or a transform from submap relative coordinates to UTM relative coordinates or ECEF relative coordinates. For example, a transform associated with a submap may include a six degree of freedom (6 DoF) transform. In some non-limiting embodiments, transforms include transforms that convert coordinates between various global projections, such as from UTM coordinates to ECEF coordinates or latitude and longitude coordinates, and/or the like.

In some non-limiting embodiments, a submap includes an information layer that contains a projection between submap relative coordinates in the local Euclidean space of the submap and latitude and longitude points, a transform from the submap relative coordinates to UTM coordinates (and/or vice-versa), a transform from the submap relative coordinates to ECEF coordinates (and/or vice-versa), a transform from the submap relative coordinates to one or more other submap relative coordinates in one or more other local Euclidean spaces of one or more other submaps (and/or vice-versa), and/or the like. For example, map generation system 102 and/or autonomous vehicle 104 can store the information layer in association with the submap within map data.

As further shown in FIG. 4, at step 404, process 400 includes determining a route using projections. For example, map generation system 102 and/or autonomous vehicle 104 (e.g., vehicle computing system 106, etc.) determine a route (e.g., a route, a map including a route, a route represented as a map, etc.) that includes a first roadway in the first submap and a second roadway in the second submap using a first projection between a global coordinate system and the first local Euclidean space and a second projection between the global coordinate system and the second local Euclidean space. As an example, map generation system 102 and/or autonomous vehicle 104 (e.g., vehicle computing system 106, etc.) determine a route between a pick-up location (or a current location) and a destination location (and, if necessary, waypoints therebetween) of autonomous vehicle 104. In some non-limiting embodiments, the route including the first roadway and the second roadway are represented by a same space or coordinate system, such as the global coordinate system, the first local Euclidean space, the second local Euclidean space, another local Euclidean space, an ECEF coordinate system, and/or the like.

In some non-limiting embodiments, if UTM is used as a global reference system, the coordinate center point is the single point where the projection is accurate, and as the map relative coordinates increase in magnitude, they accrue projection error based on a distance of the submap from the center of the UTM zone. Further, transforms between submaps that are in different UTM zones may not be created and, if a city is on a UTM zone boundary, that city may not be accurately mapped and/or represented. Moreover, use of UTM as a global reference system also introduces errors into longer distance routes that cross multiple zones. Still further, if a UTM zone of a submap is not recorded (e.g., stored in association with the submap), it is instead calculated from a best (e.g., closest, most likely, etc.) UTM zone to the latitude and longitude point of the submap, which means that the zone boundary problem associated with a city on a UTM zone boundary described herein cannot be solved by forcing the UTM zone of a submap to be in an adjacent zone.

In some non-limiting embodiments, if a determination of whether UTM zones of two or more submaps match when processing the two or more submaps together is not made, errors associated with non-matching submaps may not be detected except by puzzling errors.

In some non-limiting embodiments, a UTM transform for each submap is embedded in a lane graph of that submap, which increases processing time and load associated with reading and modifying the information layers associated with that submap, and requires a lengthy process to change an internal representation of that submap, because of the map upgrade process required for lane graph changes.

In some non-limiting embodiments, UTM does not preserve distances, and distance errors increase the farther from the two great circles where the UTM scale factor makes distances one-to-one. In this way, although a center of a submap projects to the correct latitude and longitude point, as the map relative coordinates leave that point, the map relative points accrue error such that 1 m in the submap does not correspond to 1 m when converted back to a latitude and a longitude global coordinate system, and the error is worse as a map (e.g., a map of a city, etc.) approaches an edge of the UTM zone, which adds a source of error.

In some non-limiting embodiments, the UTM Y axis is only oriented north at the center of the UTM zone (X=500,000 m), and at other locations there is a difference between UTM Y and North, which can be compensated for, but using Y as an approximation for North, where the accurate value is not needed, introduces an error that varies with location.

Accordingly, in some non-limiting embodiments, a TM, which is the base projection used in UTM, is centered at an arbitrary latitude and longitude point (e.g., an origin point of a submap), and although the error characteristics of the projection are identical to UTM, the error characteristics accrue from the arbitrary center point, rather than one of the fixed center points of UTM. For example, the route that includes the first roadway and the second roadway is determined using the first projection between the global coordinate system and the first local Euclidean space, which can be a first transverse Mercator centered at a first point in the global coordinate system, and the second projection between the global coordinate system and the second local Euclidean space, which can be a second transverse Mercator centered at a second point in the global coordinate system that is different than the first point, which enables transforms between submaps that are in different UTM zones to be created and/or used, geographic locations which span multiple UTM zones to be more accurately represented, routing across submaps in multiple UTM zones to be performed more accurately, processing times and resources required to read and modify submaps to be decreased, distances between map relative points to be more accurately preserved, and an error associated with an accurate representation of North to be reduced and/or eliminated.

In some non-limiting embodiments, the route includes a map represented by the global coordinate system. For example, map generation system 102 and/or autonomous vehicle 104 (e.g., vehicle computing system 106, etc.) determine the route that includes a first roadway in the first submap and a second roadway in the second submap by converting, using the first projection between the global coordinate system and the first local Euclidean space and the second projection between the global coordinate system and the second local Euclidean space, local points in the first local Euclidean space and local points in the second local Euclidean space to global points in the global coordinate system.

In some non-limiting embodiments, the route is determined based on a transform between the first local Euclidean space and the second local Euclidean space. For example, map generation system 102 and/or autonomous vehicle 104 (e.g., vehicle computing system 106, etc.) determine the route that includes a first roadway in the first submap and a second roadway in the second submap by transforming, using the transform between the first local Euclidean space and the second local Euclidean space, first local points in the first local Euclidean space to second local points in the second local Euclidean space and/or the second local points in the second local Euclidean space to the first local points in the first local Euclidean space. As an example, the route includes a map represented by the first local Euclidean space.

In some non-limiting embodiments, the first submap includes a first portion located in a first UTM zone, and the second submap includes a second portion located in a second UTM zone different than the first UTM zone. For example, map generation system 102 and/or autonomous vehicle 104 (e.g., vehicle computing system 106, etc.) determine a route across submaps in multiple UTM zones. As an example, map generation system 102 and/or autonomous vehicle 104 (e.g., vehicle computing system 106, etc.) can generate and display a larger scale map represented by a Euclidean space that includes one or more routes associated with roadways in multiple UTM zones.

In some non-limiting embodiments, the route is determined by transforming a first local point in the first local Euclidean space to a first global point in the global coordinate system based on the first projection, transforming a second local point in the second local Euclidean space to a second global point in the global coordinate system based on the second projection, transforming a third local point in a third local Euclidean space to a third global point in the global coordinate system based on a third projection between the global coordinate system and the third local Euclidean space, and determining a position of the first local point relative to the second local point and the third local point in the global coordinate system. For example, the route further includes the one or more roadways in at least one third submap between the first submap and the second submap, wherein the third submap is represented by the third local Euclidean space. As an example, map generation system 102 and/or autonomous vehicle 104 (e.g., vehicle computing system 106, etc.) determine the route including the one or more roadways in at least one third submap between the first submap and the second submap using the projections between the first, second, and third local Euclidean spaces and the global coordinate system to transform local points in the first second and the third local Euclidean spaces to the global coordinate system. As an example, map generation system 102 and/or autonomous vehicle 104 (e.g., vehicle computing system 106, etc.) can generate global points associated with a route including roadways in the first, second and third local Euclidean spaces, such as global points associated with a pick-up location (or a current location) in the first local Euclidean space, a destination location in the second local Euclidean space, one or more waypoints therebetween in the third local Euclidean space, and/or the like. In some non-limiting embodiments, map generation system 102 and/or autonomous vehicle 104 (e.g., vehicle computing system 106, etc.) can transform the global points associated with the route including roadways in the first, second, and third local Euclidean spaces to a same local Euclidean space, such as one of the first, second, and third local Euclidean spaces, or another local Euclidean space, such as, ECEF, and/or the like.

Further details regarding step 404 of process 400 are provided below with regard to FIG. 5.

As further shown in FIG. 4, at step 406, process 400 includes providing the route. For example, map generation system 102 and/or autonomous vehicle 104 (e.g., vehicle computing system 106, etc.) provide the route to autonomous vehicle 104. In some non-limiting embodiments, map generation system 102 provides the route to autonomous vehicle 104 for driving on the first roadway and the second roadway. For example, map generation system 102 can obtain the map data, determine the route using the projections, and transmit the route to autonomous vehicle 104. In some non-limiting embodiments, autonomous vehicle 104 (e.g., vehicle computing system 106, etc.) provides the route for use by at least one functionality or system (e.g., perception system 220, prediction system 222, motion planning system 224, vehicle controls 226, etc.) of autonomous vehicle 104 on the first roadway and the second roadway. For example, vehicle computing system 106 can obtain the map data, determine the route using the projections, and use the route to control the at least one functionality of autonomous vehicle 104. As an example, vehicle computing system 106 controls driving or travel of autonomous vehicle 104 on the first roadway and the second roadway based on the route.

In some non-limiting embodiments, at least one functionality of autonomous vehicle 104 includes a functionality of at least one of the following systems: one or more sensors, a perception system, a prediction system, a motion planning system, and/or the like. For example, the at least one functionality (or system) includes at least one of the following functionalities or systems: a localization function or system (e.g., a localization function or system that uses LIDAR point clouds and/or precise pose positioning to determine a precise location of autonomous vehicle 104), an object tracking and/or classification function or system (e.g., an object tracking and/or classification function or system detects and/or tracks objects (e.g., vehicles, pedestrians, bicycles, and the like) that are proximate to (e.g., in proximity to the surrounding environment) of autonomous vehicle 104 over a time period and/or determines state data for the objects), a motion planning function or system (e.g., a motion planning function or system that determines a motion plan for autonomous vehicle 104 based on one or more cost functions), a vehicle controller function or system that controls autonomous driving or travel of autonomous vehicle 104 on one or more roadways, and/or the like.

Further details regarding step 406 of process 400 are provided below with regard to FIG. 5.

Figure 5:
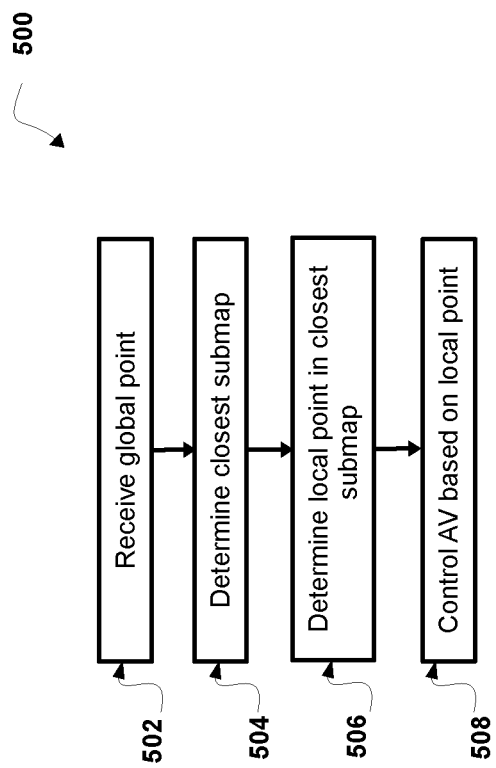
FIG. 5 is a flowchart of a non-limiting embodiment of a process for providing a route.

Referring now to FIG. 5, FIG. 5 is a flowchart of a non-limiting embodiment of a process 500 for providing a route. In some non-limiting embodiments, one or more of the steps of process 500 are performed (e.g., completely, partially, etc.) by autonomous vehicle 104 (e.g., one or more devices of autonomous vehicle 104). In some non-limiting embodiments, one or more of the steps of process 500 are performed (e.g., completely, partially, etc.) by another device or a group of devices separate from or including autonomous vehicle 104, such as map generation system 102 (e.g., one or more devices of map generation system 102).

As shown in FIG. 5, at step 502, process 500 includes receiving a global point. For example, map generation system 102 and/or autonomous vehicle 104 (e.g., vehicle computing system 106, etc.) receive a global point including a latitude coordinate and a longitude coordinate. As an example, vehicle computing system receives a global point associated with a pick-up location (or a current location), a destination location, and/or one or more waypoints therebetween. In some non-limiting embodiments, autonomous vehicle 104 includes positioning system 204 that determines positioning data associated with a position of autonomous vehicle 104 as the global point.

As shown in FIG. 5, at step 504, process 500 includes determining a closest submap. For example, map generation system 102 and/or autonomous vehicle 104 (e.g., vehicle computing system 106, etc.) determine in the map a closest submap associated with the global point, wherein the closest submap is represented by a closest local Euclidean space. As an example, map generation system 102 and/or autonomous vehicle 104 (e.g., vehicle computing system 106, etc.) determine a submap in the map that has an origin point a shortest distance from the global point in the global coordinate system. For example, map generation system 102 and/or autonomous vehicle 104 (e.g., vehicle computing system 106, etc.) determine a submap in which autonomous vehicle 104 is currently located based on the current position of autonomous vehicle 104.

As shown in FIG. 5, at step 506, process 500 includes determining a local point in the closest submap. For example, map generation system 102 and/or autonomous vehicle 104 (e.g., vehicle computing system 106, etc.) determines a local point in the closest local Euclidean space using a projection between the global coordinate system and the closest local Euclidean space. As an example, map generation system 102 and/or autonomous vehicle 104 (e.g., vehicle computing system 106, etc.) transforms the latitude coordinate and the longitude coordinates of the global point to X/Y coordinates in the local Euclidean space using the projection between the global coordinate system and the closest local Euclidean space, wherein the origin of the closest local Euclidean space is at a 0, 0 X/Y coordinate point in the local Euclidean space.

As shown in FIG. 5, at step 508, process 500 includes controlling an AV based on the local point. For example, map generation system 102 and/or autonomous vehicle 104 (e.g., vehicle computing system 106, etc.) control the at least one functionality of autonomous vehicle 104 based on the local point. As an example, vehicle computing system 106 can use a higher resolution localization function or system that uses sensor point data (e.g., LIDAR point clouds) and/or a precise pose positioning technique, which is associated with fully-autonomous operation and/or travel under a fully-autonomous mode, to determine the location of autonomous vehicle 104 with respect to the closest submap, which can reduce or eliminate an initialization time, a boot time, a bootstrapping time, and/or the like associated with a functionality and/or system of the fully-autonomous mode initializing, booting, bootstrapping and/or the like before fully-autonomous travel can begin by enabling direct transformation of the global coordinates to local submap coordinates (e.g., without requiring transformation of the global coordinates to UTM coordinates before transformation to local submap coordinates). As an example, vehicle computing system 106 can generate a route based on a transform between the first local Euclidean space of the first submap and the second local Euclidean space of the second submap by transforming a local point in the second local Euclidean space of the second submap to the first local Euclidean space of the first submap based on the transform and control of the at least one functionality of autonomous vehicle 104 based on the transformed local point.

In some non-limiting embodiments, vehicle computing system 106 controls driving of autonomous vehicle 104 on the first roadway and the second roadway based on the local point. For example, vehicle computing system 106 controls one or more vehicle controls 226 (e.g., a device that controls acceleration, a device that controls steering, a device that controls braking, an actuator that controls gas flow, etc.) of autonomous vehicle 104 based on the local point, positioning data, sensor data, and/or map data to control travel of autonomous vehicle 104 on the first roadway and the second roadway on the route.

In some non-limiting embodiments, vehicle computing system 106 controls autonomous vehicle 104 to perform the at least one functionality based on the local point satisfying at least one threshold (e.g., a local distance to another point, an estimated travel time to another point, etc.). For example, if the local point is associated with a current position or a destination point of autonomous vehicle 104, vehicle computing system 106 can compare the current position or the destination point with respect to another position (e.g., the other of the current position or the destination point), and control autonomous vehicle 104 to perform the at least one functionality with respect to the local point satisfying the threshold position. As an example, vehicle computing system 106 can delay maintenance or execution of the at least one functionality (e.g., high resolution LIDAR-based localization, etc.) with respect to another submap until autonomous vehicle 104 is within the threshold distance and/or within the threshold travel time of the another submap, which enables reducing processing and/or system load.

Referring now to FIGS. 6A-6E, FIGS. 6A-6E are diagrams of an overview of a non-limiting embodiment of an implementation 600 relating to a process for controlling an autonomous vehicle. As shown in FIGS. 6A-6E, implementation 600 may include map generation system 602, autonomous vehicle 604, vehicle computing system 606, and vehicle controls 626. In some non-limiting embodiments, map generation system 602 may be the same or similar to map generation system 102. In some non-limiting embodiments, autonomous vehicle 604 may be the same or similar to autonomous vehicle 104. In some non-limiting embodiments, vehicle computing system 606 may be the same or similar to vehicle computing system 106. In some non-limiting embodiments, vehicle controls 626 may be the same or similar to vehicle controls 226.

Figure 6A:
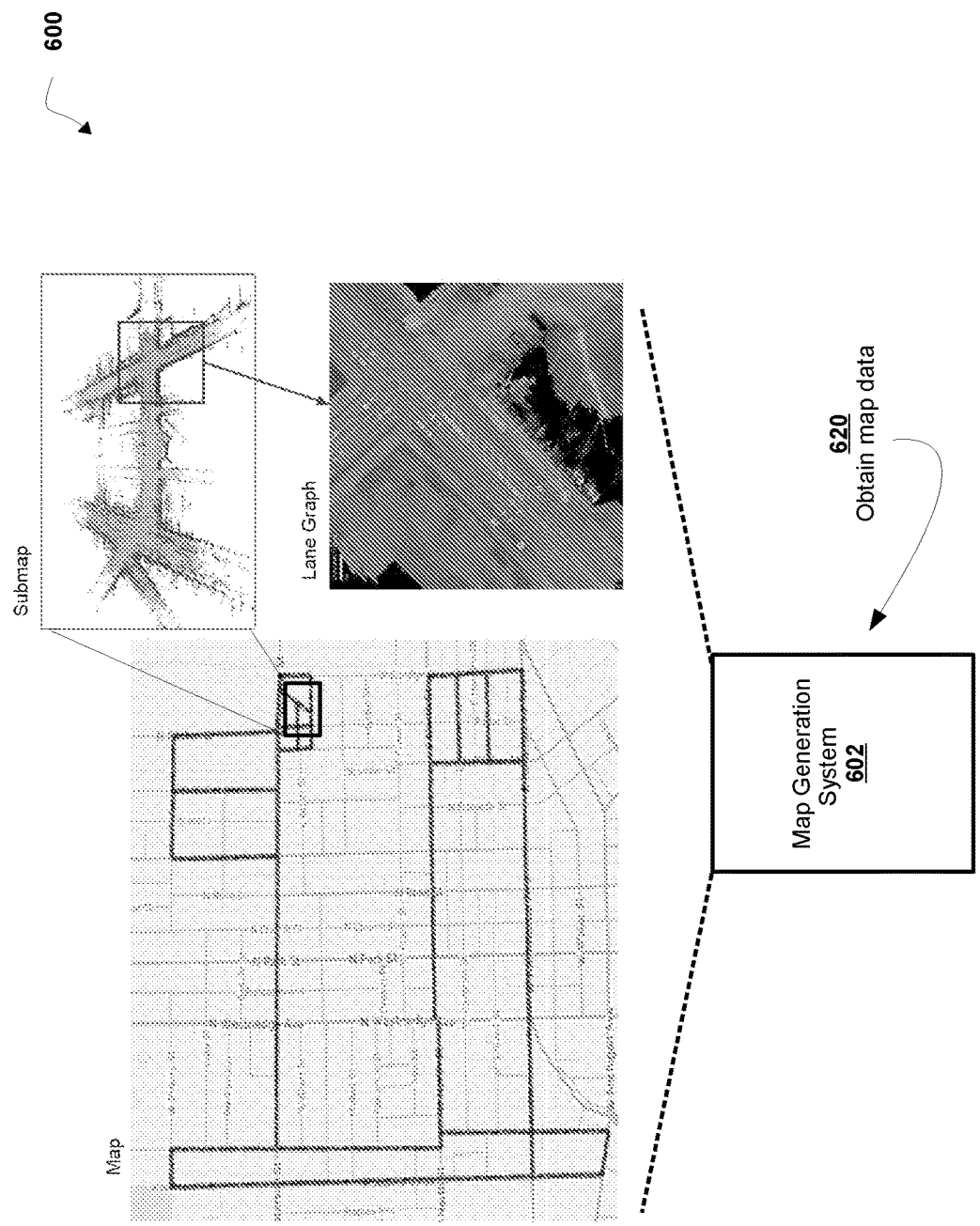
FIGS. 6A-6E are diagrams of an implementation of a non-limiting embodiment of a process disclosed herein.

As shown by reference number 620 in FIG. 6A, map generation system 602 obtains map data associated with a map of a geographic location including one or more roadways. In some non-limiting embodiments, the map includes a first submap represented by a first local Euclidean space, a second submap represented by a second local Euclidean space, a first projection between a global coordinate system and the first local Euclidean space, and a second projection between the global coordinate system and the second local Euclidean space.

Figure 6B:
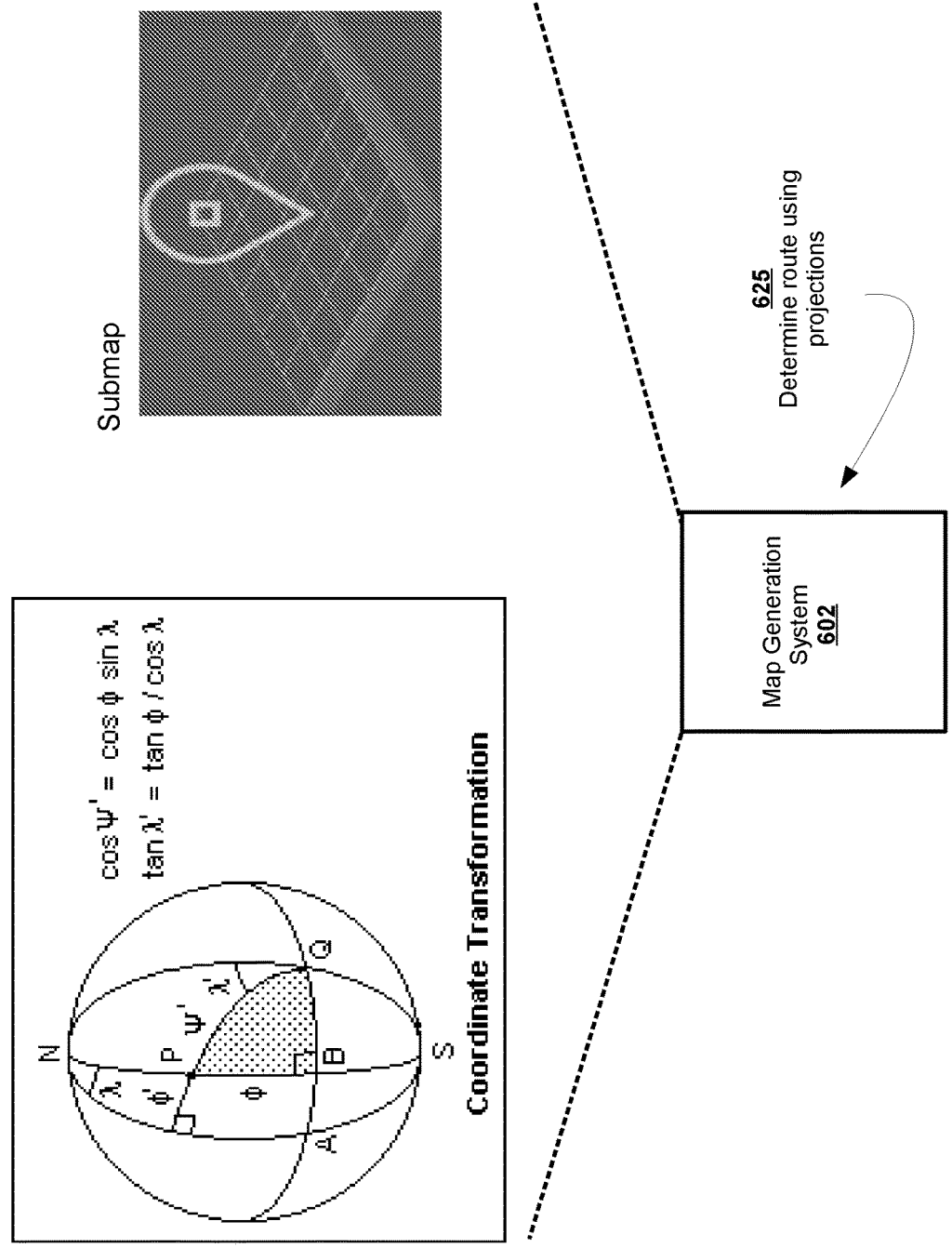

As shown by reference number 625 in FIG. 6B, map generation system 602 determines a route that includes a first roadway in the first submap and a second roadway in the second submap using the first projection and the second projection. For example, map generation system 602 determines a route, a map including a route, a route represented as map, and/or the like that includes the first roadway and the second roadway using the first projection and the second projection.

Figure 6C:
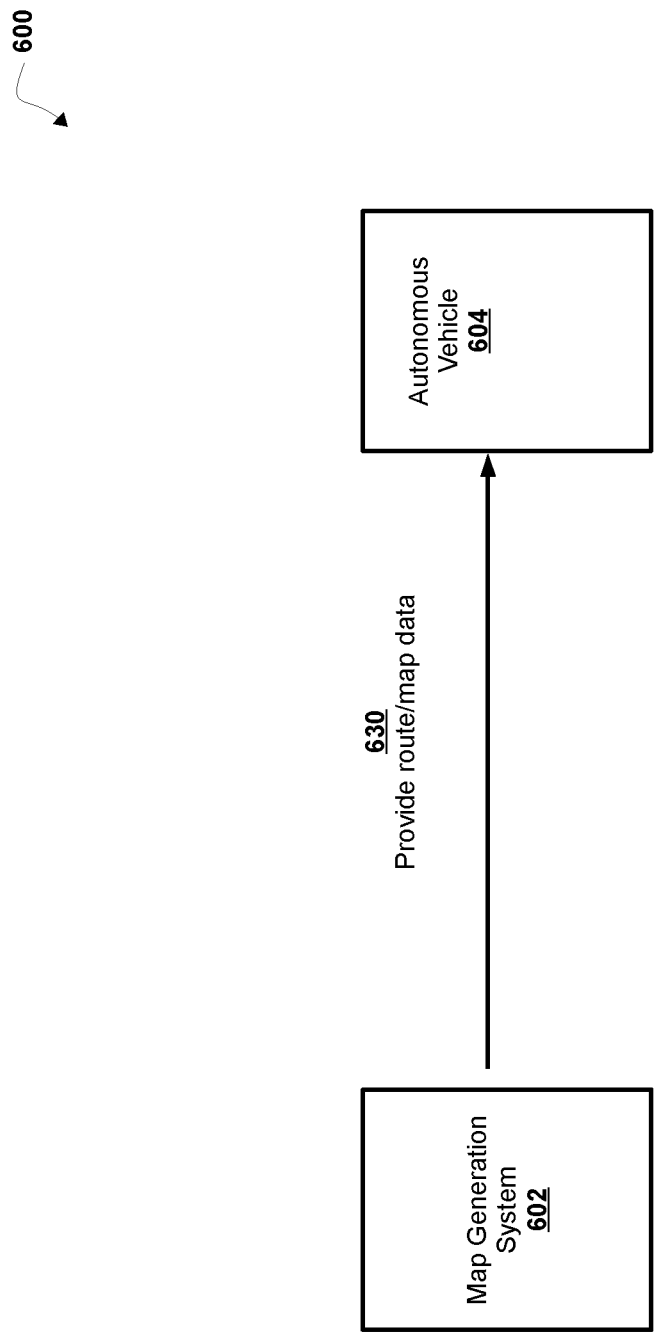

As shown by reference number 630 in FIG. 6C, map generation system 602 provides the route to autonomous vehicle 604 for driving on the first roadway and the second roadway. For example, map generation system 602 transmits map data including the route to autonomous vehicle 604.

Figure 6D:
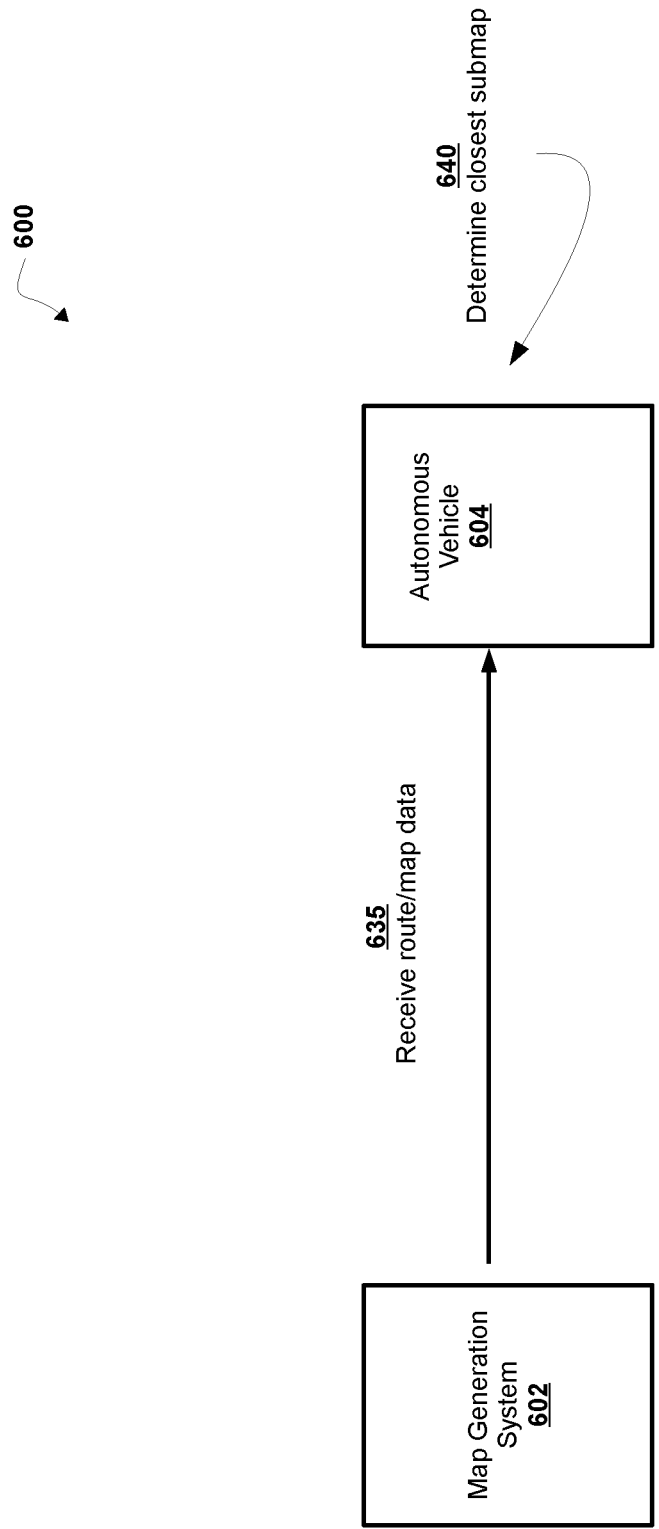

As shown by reference number 635 in FIG. 6D, autonomous vehicle 604 receives the map data from map generation system 602. For example, the map data includes the route that includes the first roadway and the second roadway. However, it is noted that in some non-limiting embodiments, autonomous vehicle 604 (e.g., vehicle computing system 606, etc.) can perform (e.g., completely, partially, etc.) one or more of the functions or operations associated with reference numbers 620, 625, and 630. For example, vehicle computing system 606 can obtain the map data, determine the route using the projections, and provide the route for driving on the first roadway and the second roadway.

As shown by reference number 640 in FIG. 6D, autonomous vehicle 604 determines in the map a closest submap. For example, autonomous vehicle 604 (e.g., vehicle computing system 606) receives a global point including a latitude coordinate and a longitude coordinate (e.g. a pick-up position, a current position, a destination position, one or more waypoint positions, etc.) and determines in the map a closest submap associated with the global point, the closest submap being represented by a closest local Euclidean space. As an example, vehicle computing system 606 determines the closest submap to the current location of autonomous vehicle 604 (e.g., the submap in which autonomous vehicle 604 is currently located) based on the global point, for example, by comparing distances between the global point and global points of origin points of submaps in the map.

Figure 6E:
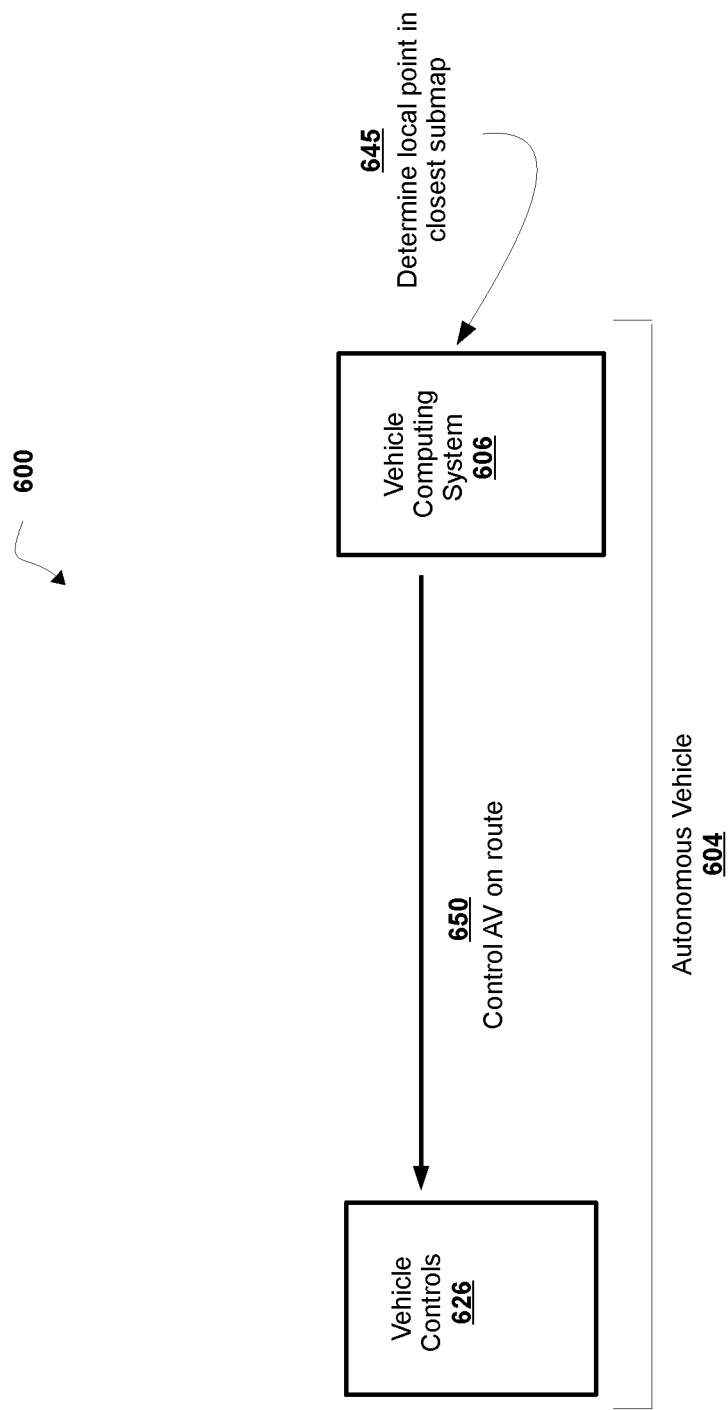

As shown by reference number 645 in FIG. 6E, vehicle computing system 606 determines a local point in the closest local Euclidean space using a projection between the global coordinate system and the closest local Euclidean space. For example, vehicle computing system 606 transforms the global point including the latitude coordinate and the longitude coordinate to an X/Y coordinate in the local Euclidean space of the closest submap.

As shown by reference number 650 in FIG. 6E, vehicle computing system 606 controls autonomous vehicle 604 on the route. For example, vehicle computing system 512 controls one or more vehicle controls 626 (e.g., a device that controls acceleration, a device that controls steering, a device that controls braking, an actuator that controls gas flow, etc.) of autonomous vehicle 604 based on the route and the local point (e.g., the current position of autonomous vehicle 604, etc.) to control operation and/or travel of autonomous vehicle 604.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method comprising:

obtaining, with a computer system comprising one or more processors, map data associated with a map of a geographic location including one or more roadways, the map comprising a first submap and a second submap;

determining, with the computer system, a route that includes a first roadway in the first submap and a second roadway in the second submap, the determining using a first projection between a global coordinate system and a first coordinate frame of the first submap and also using a second projection between the global coordinate system and a second coordinate frame of the second submap, the first projection centered at a first point in the global coordinate system and transforming global coordinates in the global coordinate system to local coordinates in the first coordinate frame of the first submap, the second projection centered at a second point in the global coordinate system that is different than the first point and transforming the global coordinates in the global coordinate system to local coordinates in the second coordinate frame of the second submap; and providing, with the computer system, the route to an autonomous vehicle (AV) for driving on the first roadway and the second roadway.

2. The method of claim 1, wherein the route includes a map represented by the global coordinate system.

3. The method of claim 1, wherein the first projection includes a first transverse Mercator centered at the first point in the global coordinate system, and wherein the second projection includes a second transverse Mercator centered at the second point in the global coordinate system.

4. The method of claim 1, wherein the first submap includes a first portion located in a first Universal Transverse Mercator (UTM) zone, and wherein the second submap includes a second portion located in a second UTM zone different than the first UTM zone.

5. The method of claim 1, wherein the first point includes first latitude and longitude coordinates, and wherein the second point includes second latitude and longitude coordinates.

6. The method of claim 1, wherein determining the route further comprises:

determining, with the computer system, a transform between the first coordinate frame and the second coordinate frame; and determining, with the computer system, the route based on the transform.

7. The method of claim 1, wherein the route further includes one or more roadways in a third submap positioned between the first submap and the second submap, wherein the third submap is described by a third coordinate frame, and wherein determining the route further comprises:

transforming, with the computer system, a first local point in the first coordinate frame to a first global point in the global coordinate system based at least in part on the first projection;

transforming, with the computer system, a second local point in the second coordinate frame to a second global point in the global coordinate system based at least in part on the second projection;

transforming, with the computer system, a third local point in the third coordinate frame to a third global point in the global coordinate system based on a third projection between the global coordinate system and the third coordinate frame; and determining, with the computer system, a position of the first local point relative to the second local point and the third local point in the global coordinate system.

8. The method of claim 1, wherein determining the route further comprises:

receiving, with the computer system, a global point including a latitude coordinate and a longitude coordinate;

determining, with the computer system, a closest submap associated with the global point, the closest submap being described by a closest coordinate frame; and determining, with the computer system, a local point in the closest coordinate frame using a projection between the global coordinate system and the closest coordinate frame.

9. A computing system comprising:

one or more processors programmed or configured to perform operations comprising:

obtaining map data associated with a map of a geographic location including one or more roadways, the map comprising a first submap and a second submap;

determining a route that includes a first roadway in the first submap and a second roadway in the second submap, the determining using a first projection between a global coordinate system and a first coordinate frame of the first submap and a second projection between the global coordinate system and a second coordinate frame of the second submap, the first projection centered at a first point in the global coordinate system and transforming global coordinates in the global coordinate system to local coordinates in the first coordinate frame of the first submap, the second projection centered at a second point in the global coordinate system that is different than the first point and transforming the global coordinates in the global coordinate system to local coordinates in the second coordinate frame of the second submap; and providing the route to an autonomous vehicle (AV) for driving on the first roadway and the second roadway.

10. The computing system of claim 9, wherein the route includes a map represented by the global coordinate system.

11. The computing system of claim 9, wherein the first projection includes a first transverse Mercator centered at the first point in the global coordinate system, and wherein the second projection includes a second transverse Mercator centered at the second point in the global coordinate system.

12. The computing system of claim 9, wherein the first submap includes a first portion located in a first Universal Transverse Mercator (UTM) zone, and wherein the second submap includes a second portion located in a second UTM zone different than the first UTM zone.

13. The computing system of claim 9, wherein the first point includes first latitude and longitude coordinates, wherein the second point includes second latitude and longitude coordinates.

14. The computing system of claim 9, the operations further comprising:

determining a transform between the first coordinate frame and the second coordinate frame; and determining the route based on the transform.

15. The computing system of claim 9, wherein the route further includes one or more roadways in a third submap positioned between the first submap and the second submap, wherein the third submap is described by a third coordinate frame, the operations further comprising:

transforming a first local point in a first coordinate frame to a first global point in the global coordinate system based on the first projection;

transforming a second local point in the second coordinate frame to a second global point in the global coordinate system based on the second projection;

transforming a third local point in the third coordinate frame to a third global point in the global coordinate system based on a third projection between the global coordinate system and the third coordinate frame; and determining a position of the first local point relative to the second local point and the third local point in the global coordinate system.

16. The computing system of claim 9, the operations further comprising:

receiving a global point including a latitude coordinate and a longitude coordinate;

determining a closest submap associated with the global point, the closest submap being described by a closest coordinate frame; and determining a local point in the closest coordinate frame of the closest submap using a projection between the global coordinate system and the closest coordinate frame.

17. An autonomous vehicle (AV) comprising:

a vehicle computing system comprising one or more processors, the vehicle computing system programmed to perform operations comprising:

obtaining map data associated with a map of a geographic location including one or more roadways, the map including a first submap and a second submap;

determining a route that includes a first roadway in the first submap and a second roadway in the second submap, the determining using a first projection between a global coordinate system and a first coordinate frame of the first submap and a second projection between the global coordinate system and a second coordinate frame of the second submap, the first projection centered at a first point in the global coordinate system and transforming global coordinates in the global coordinate system to local coordinates in the first coordinate frame of the first submap, and the second projection centered at a second point in the global coordinate system that is different than the first point and transforming the global coordinates in the global coordinate system to local coordinates in the second coordinate frame of the second submap; and controlling at least one functionality of the AV on the first roadway and the second roadway based on the route.

18. The AV of claim 17, the operations further comprising:

receiving a global point including a latitude coordinate and a longitude coordinate;

determining a closest submap associated with the global point, the closest submap being described by a closest coordinate frame;

determining a local point in the closest coordinate frame using a projection between the global coordinate system and the closest coordinate frame; and control the at least one functionality of the AV based on the local point.

19. The AV of claim 17, wherein the map data is associated with a transform between the first coordinate frame of the first submap and the second coordinate frame of the second submap, the operations further comprising:

determining the route based on the transform by transforming a local point in the second coordinate frame of the second submap to the first coordinate frame of the first submap based on the transform; and controlling the at least one functionality of the AV based on the transformed local point.

20. The AV of claim 17, wherein the first projection includes a first transverse Mercator centered at the first point in the global coordinate system, and wherein the second projection includes a second transverse Mercator centered at the second point in the global coordinate system.

* * * * *